(No Model.) 11 Sheets—Sheet 4.
H. H. BLISS.
ELECTRIC COAL OR ROCK DRILL.
No. 545,570. Patented Sept. 3, 1895.
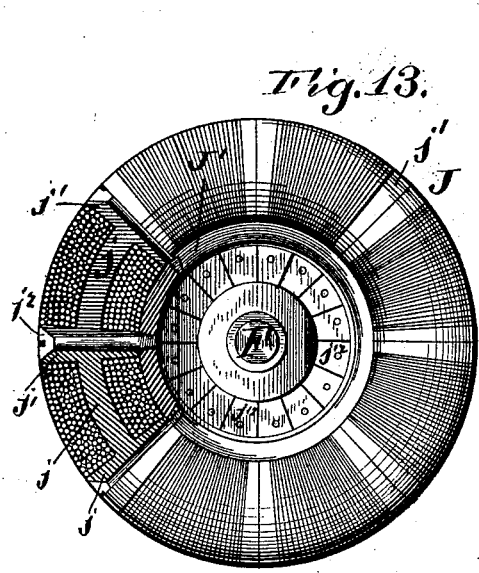
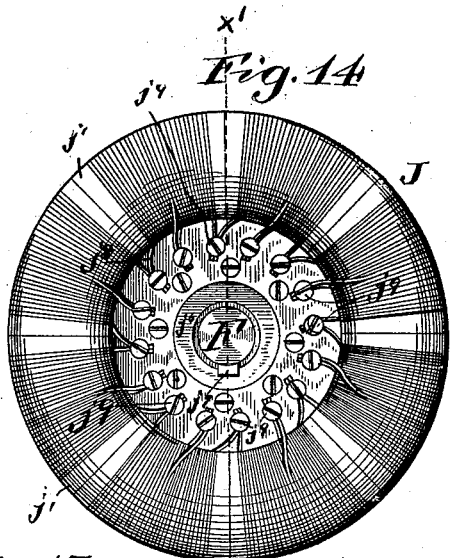
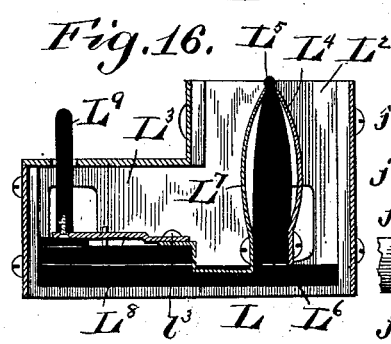
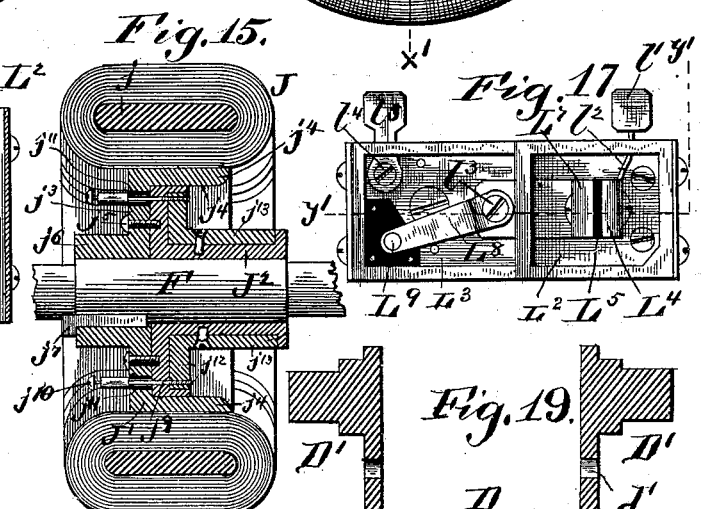
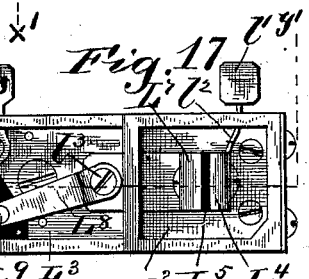
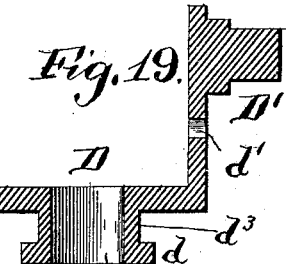
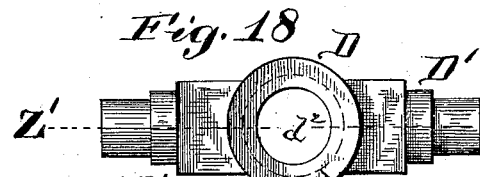
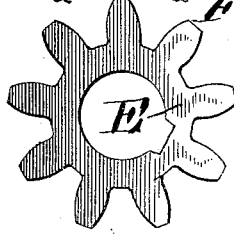
Witnesses:
J. B. McGirr.
B. W. Sommers.
Inventor:
Henry H. Bliss (No Model.) 11 Sheets—Sheet 5.

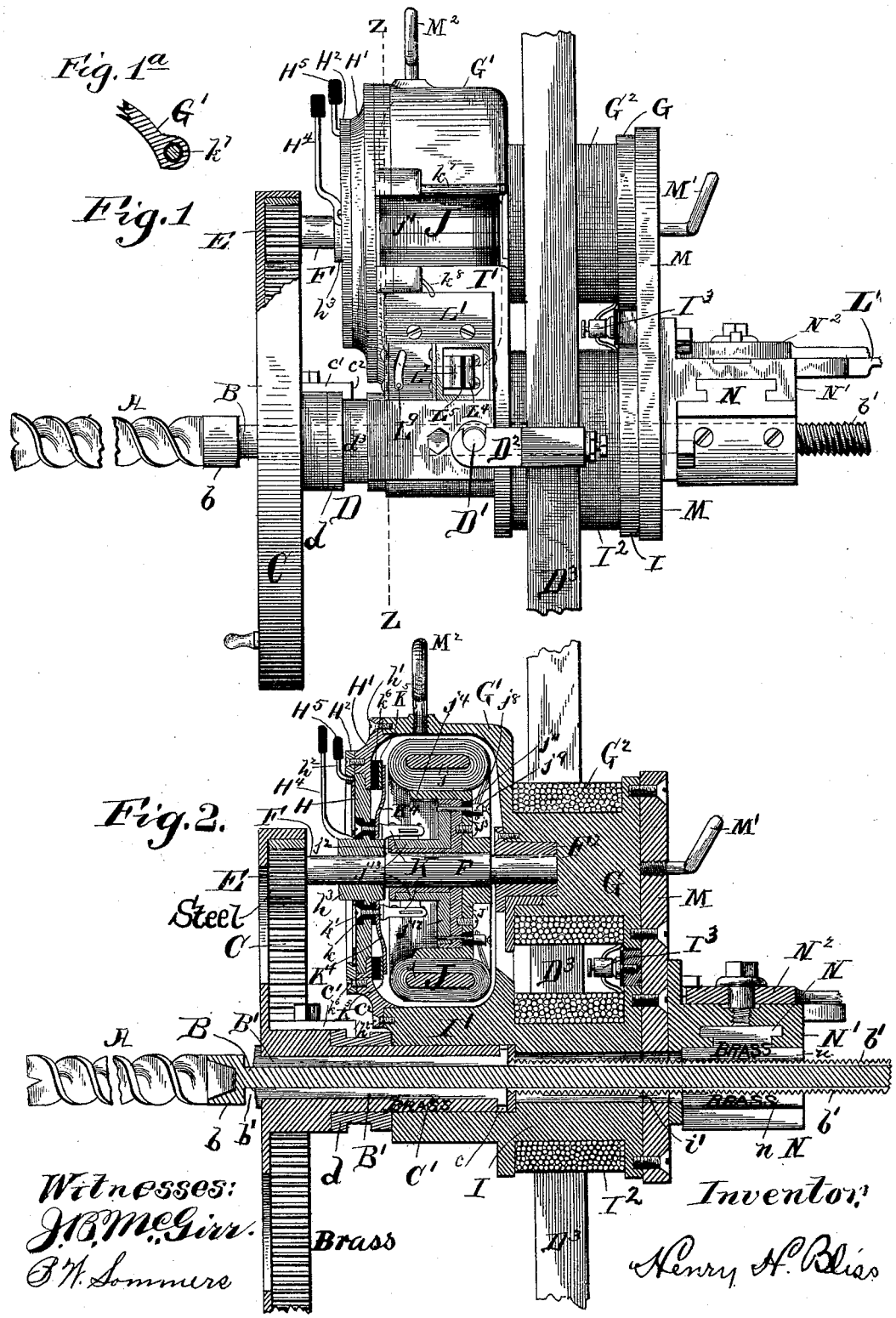

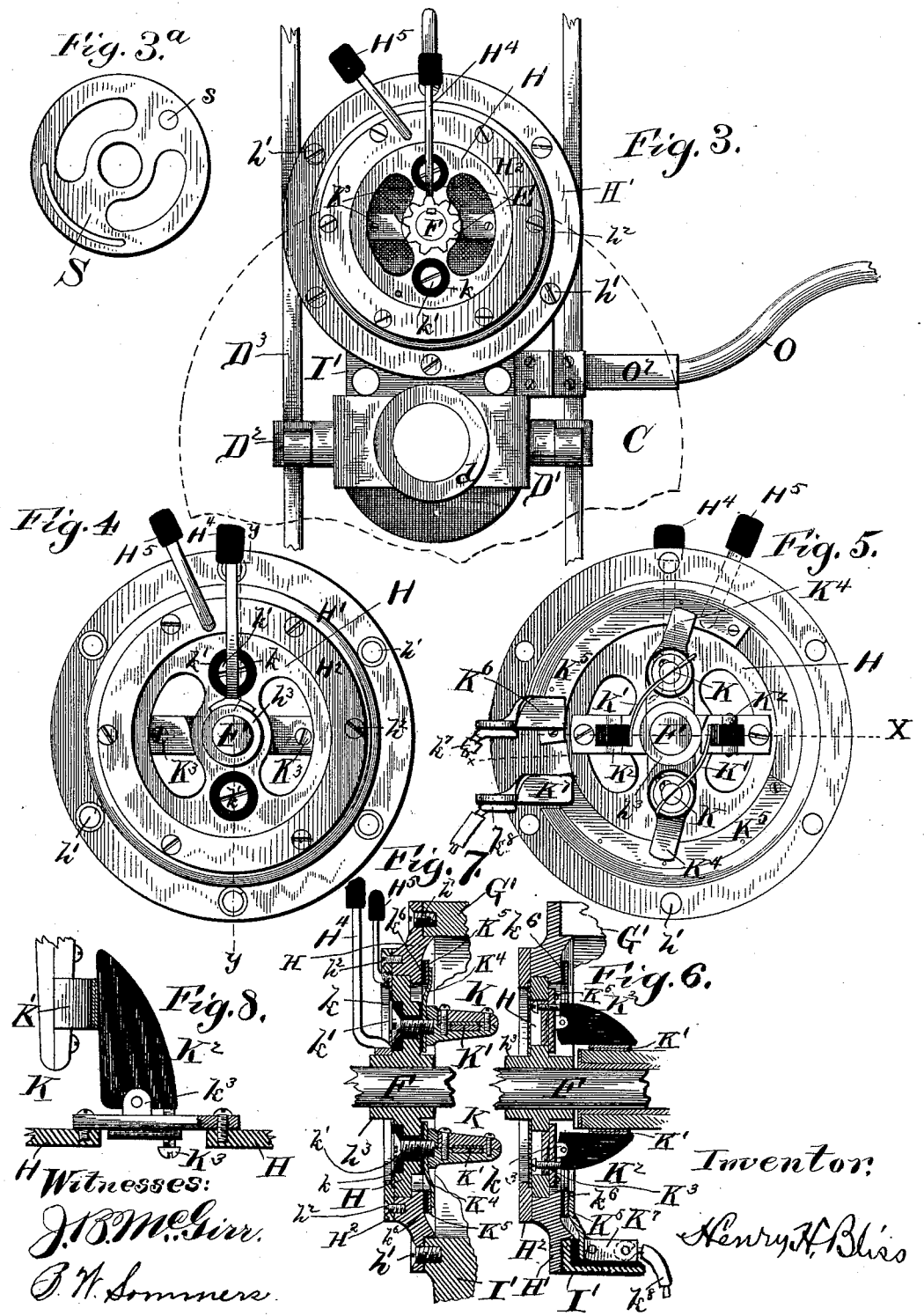

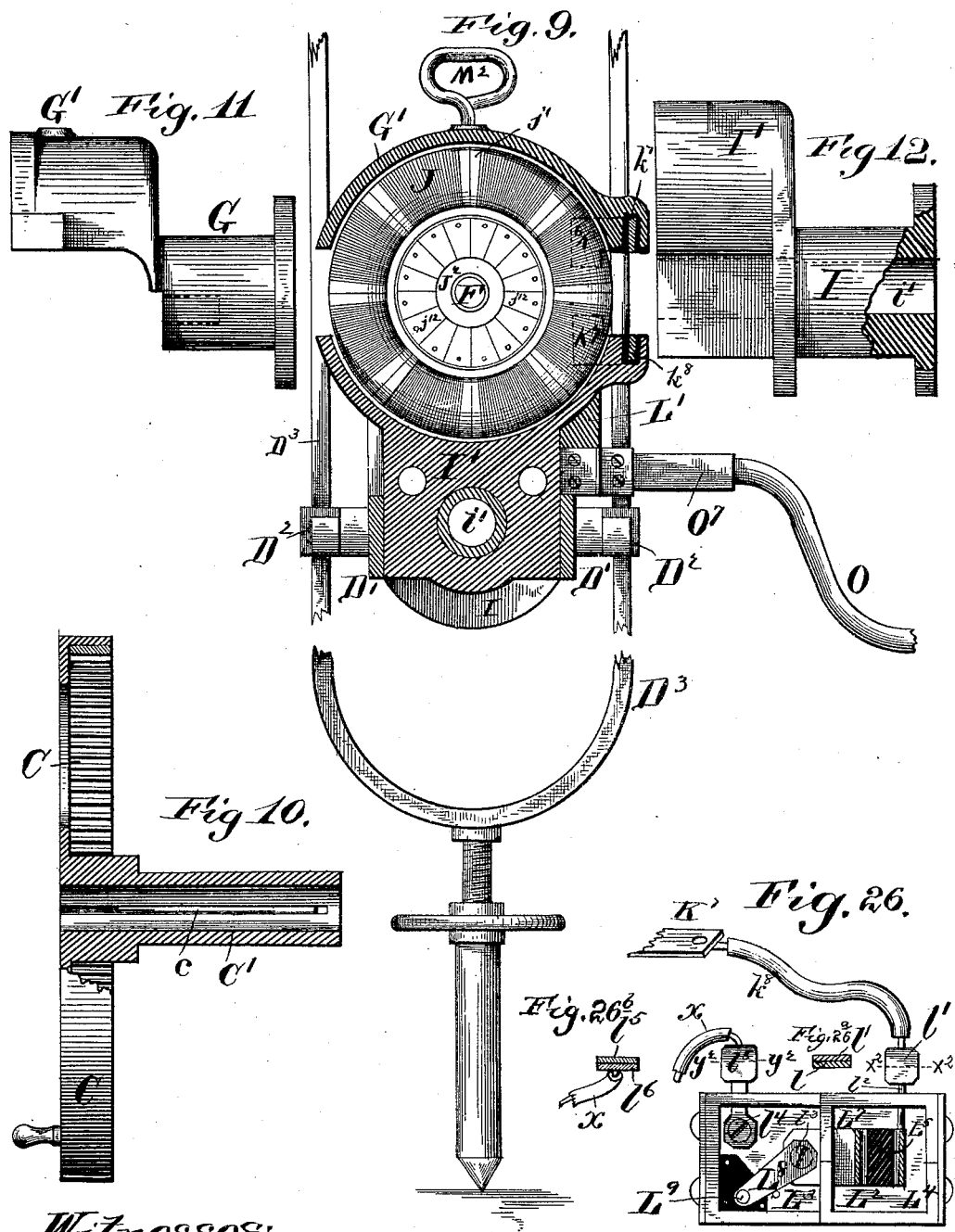

H. H. BLISS.
ELECTRIC COAL OR ROCK DRILL.

No. 545,570. Patented Sept. 3, 1895.

Witnesses:
J. B. McGiir
C. W. Sommers

Inventor:
Henry H. Bliss (No Model.)  11 Sheets—Sheet 6.
H. H. BLISS.
ELECTRIC COAL OR ROCK DRILL.
No. 545,570. Patented Sept. 3, 1895.
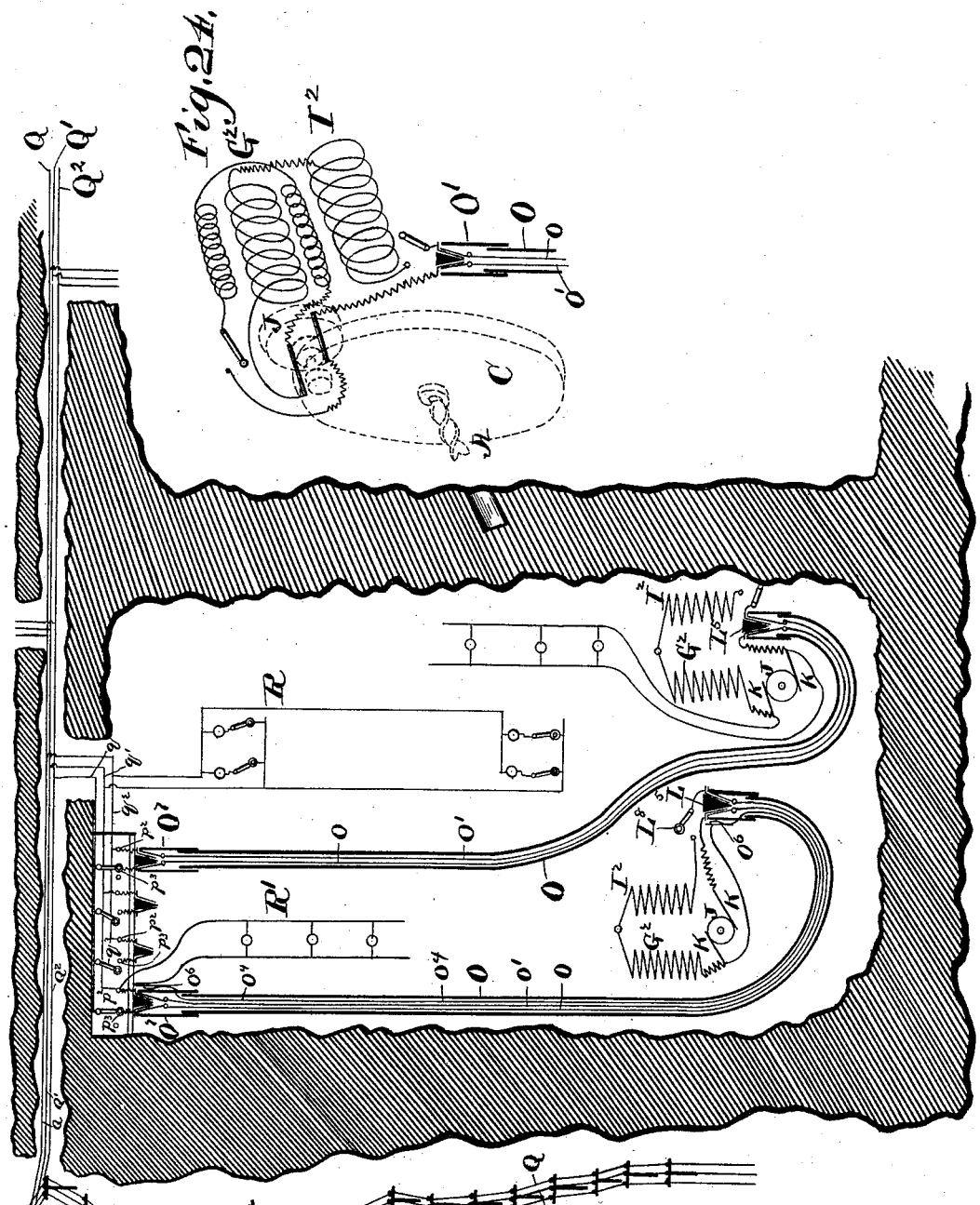
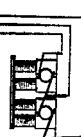
Witnesses:
J. B. McGirr.
B. W. Sommers.
Inventor:
Henry H. Bliss

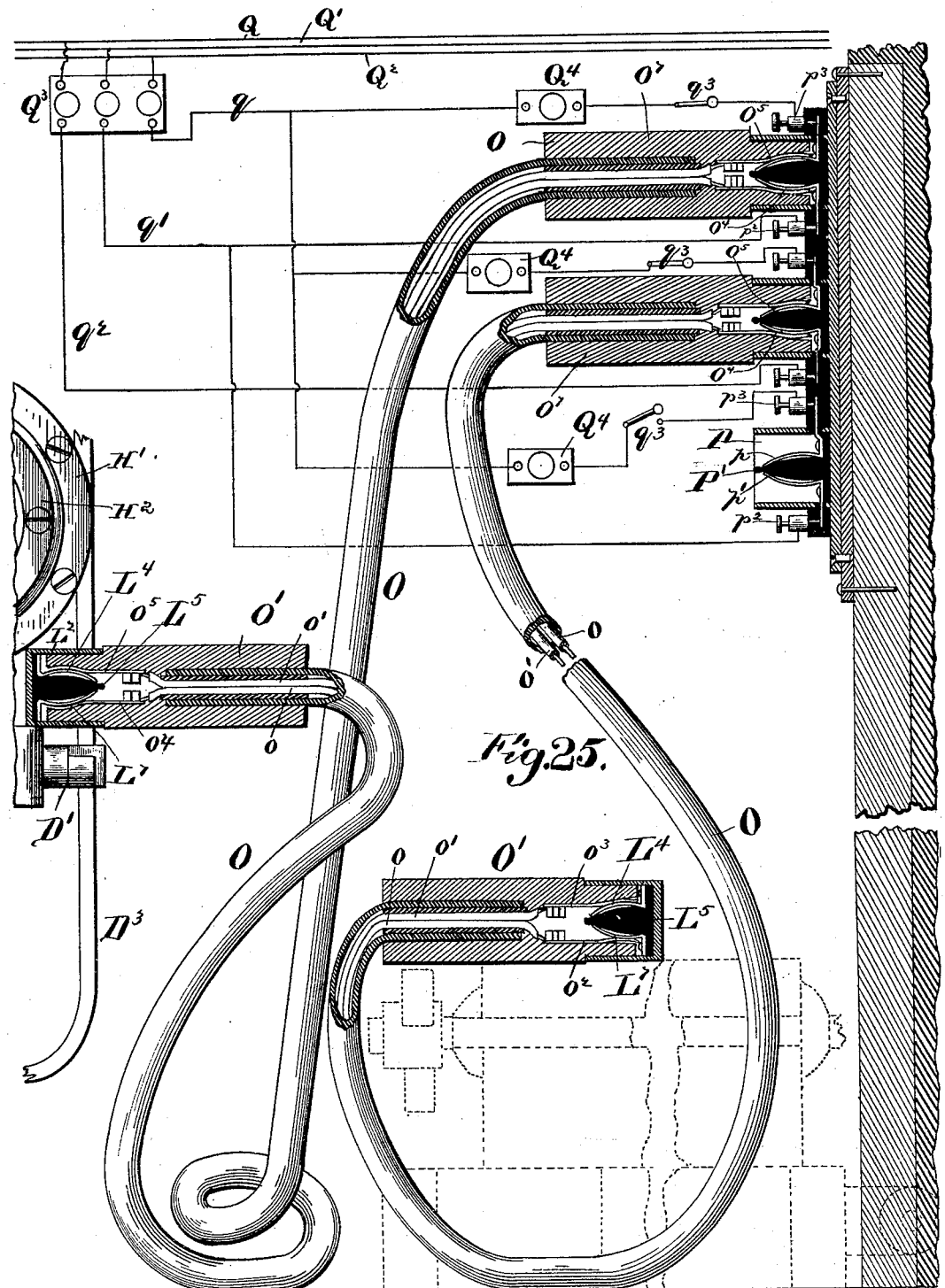

(No Model.)
11 Sheets—Sheet 8.
H. H. BLISS.
ELECTRIC COAL OR ROCK DRILL.
No. 545,570. Patented Sept. 3, 1895.
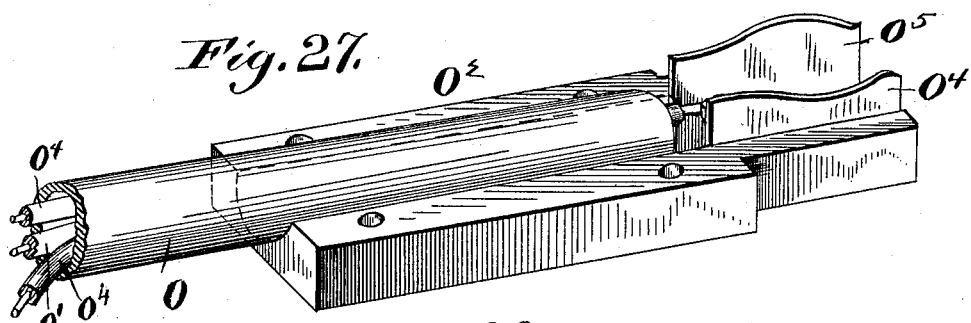
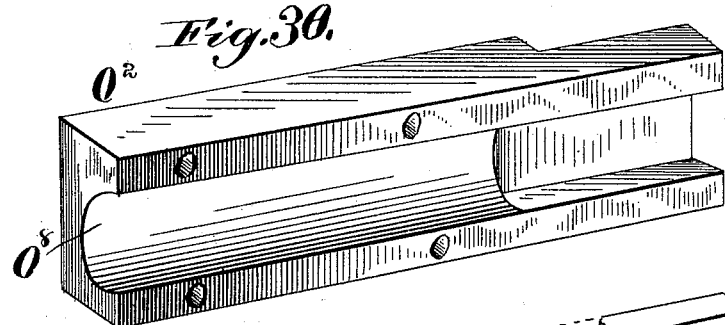
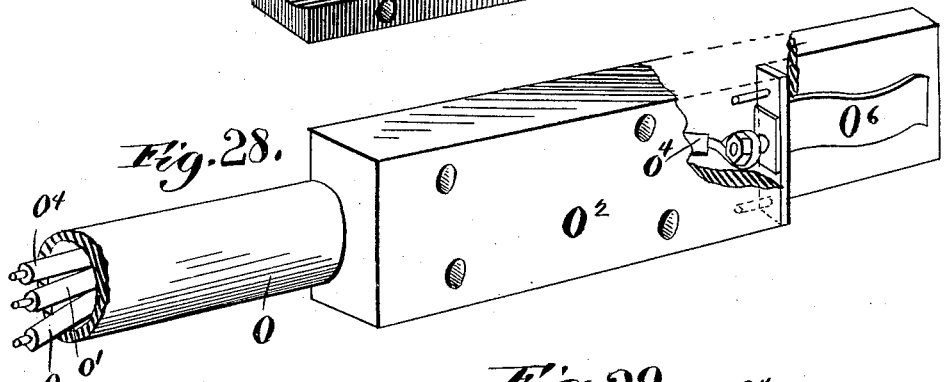
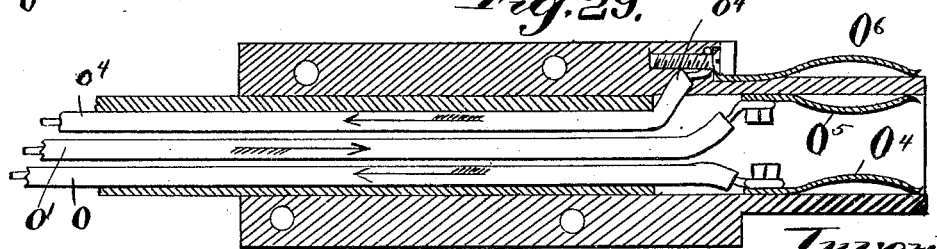
Witnesses:
J. B. McGirr.
B. W. Sommers.
Inventor
Henry H. Bliss (No Model.)

11 Sheets—Sheet 9.

H. H. BLISS.
ELECTRIC COAL OR ROCK DRILL.

No. 545,570.   Patented Sept. 3, 1895.

Witnesses:
J. B. McGiw.
B. W. Sommers.

Inventor
Henry H. Bliss

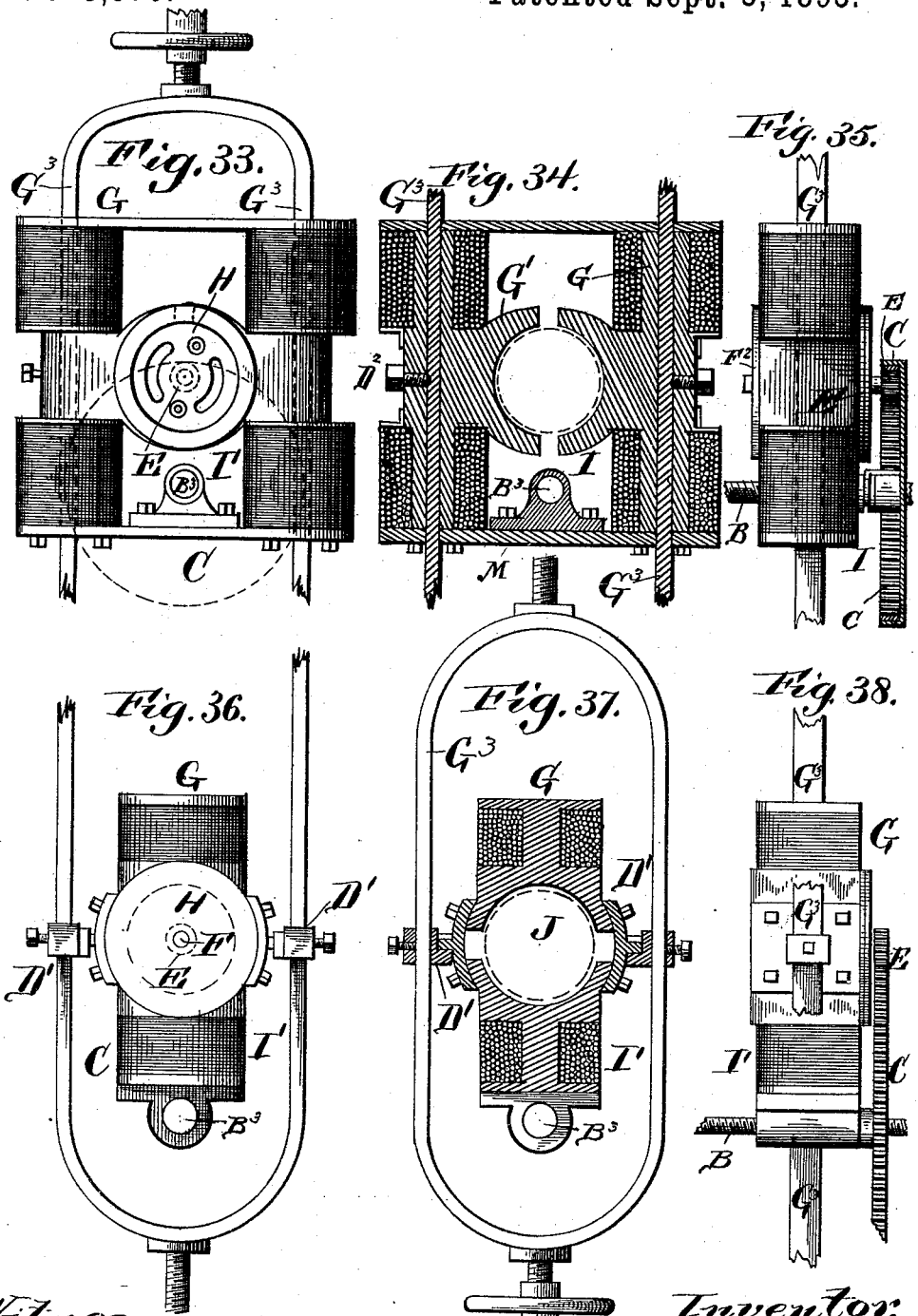

(No Model.)   11 Sheets—Sheet 11.

H. H. BLISS.
ELECTRIC COAL OR ROCK DRILL.

No. 545,570. Patented Sept. 3, 1895.

Witnesses:
J. B. McGirr.
B. W. Sommers.

Inventor:
Henry H. Bliss

UNITED STATES PATENT OFFICE.

HENRY H. BLISS, OF WASHINGTON, DISTRICT OF COLUMBIA, ASSIGNOR TO JOSEPH A. JEFFREY, OF COLUMBUS, OHIO.

ELECTRIC COAL OR ROCK DRILL.

SPECIFICATION forming part of Letters Patent No. 545,570, dated September 3, 1895.

Application filed September 6, 1888. Serial No. 284,685. (No model.)

*To all whom it may concern:*

Be it known that I, HENRY H. BLISS, a citizen of the United States, residing at Washington, in the District of Columbia, have invented certain new and useful Improvements in Electric Coal and Rock Drills, of which the following is a specification, reference being had therein to the accompanying drawings.

Figure 21:
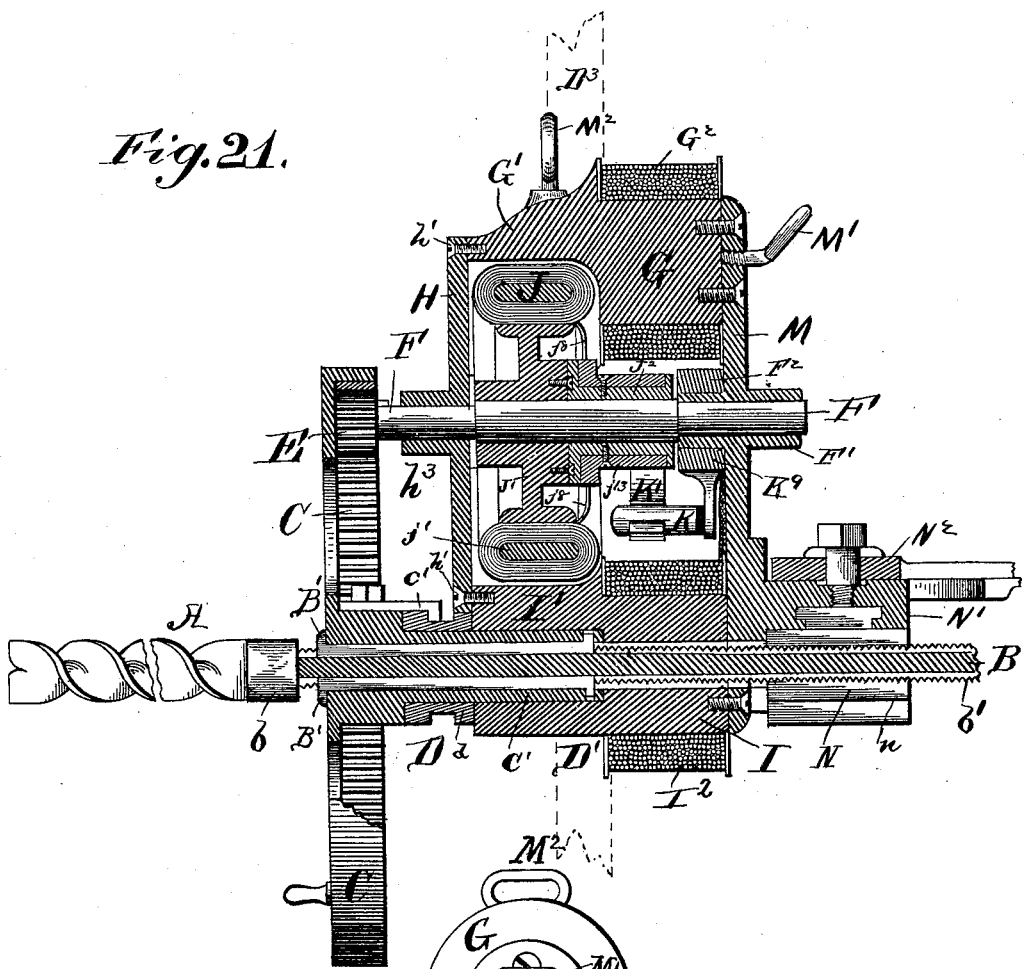
Figure 22:
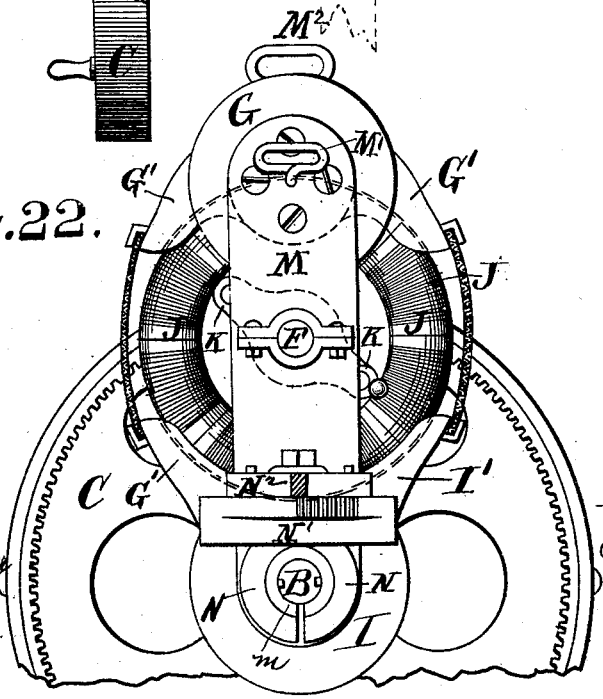
Figure 31:
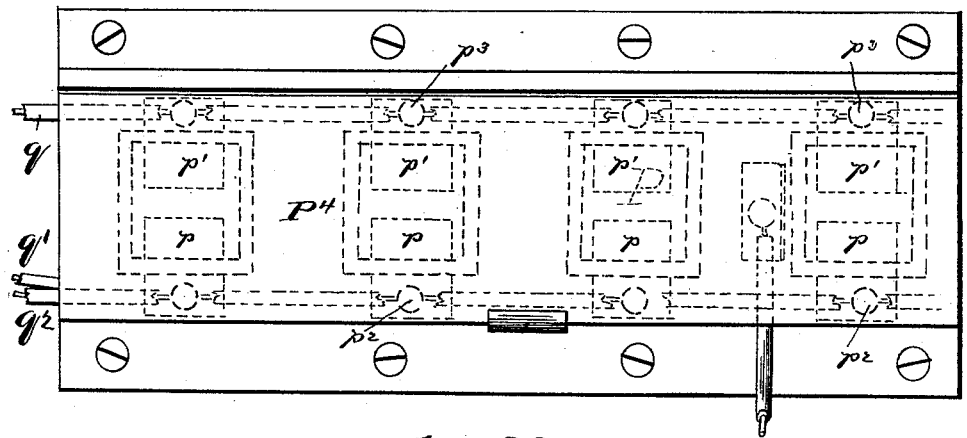
Figure 32:
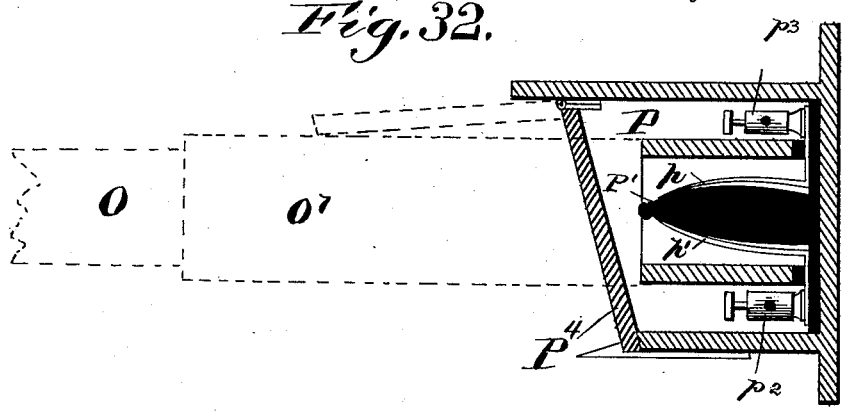
Figure 39:
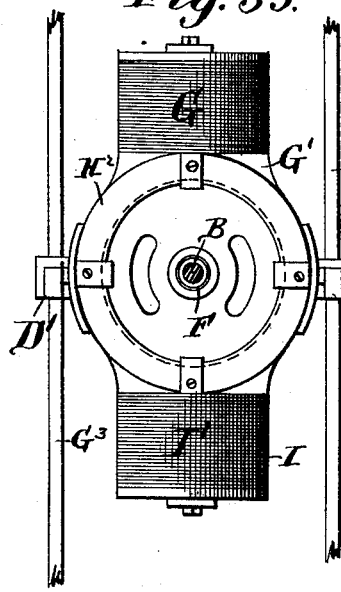
Figure 40:
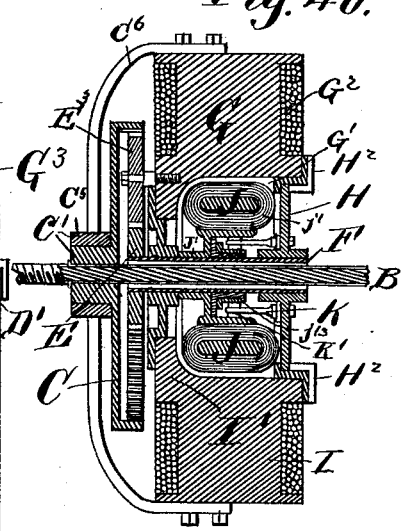
Figure 41:
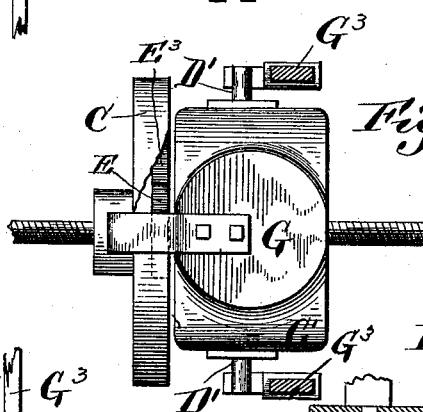
Figure 42:
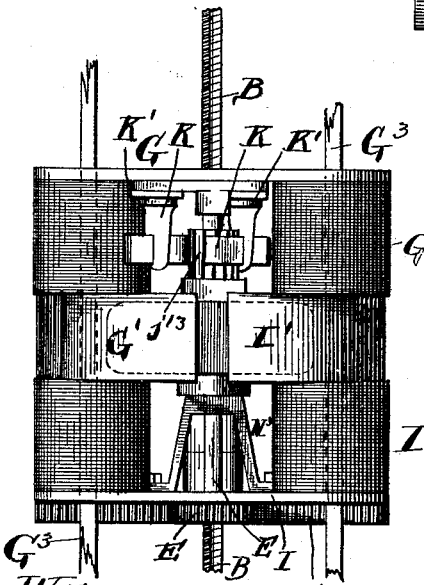
Figure 43:
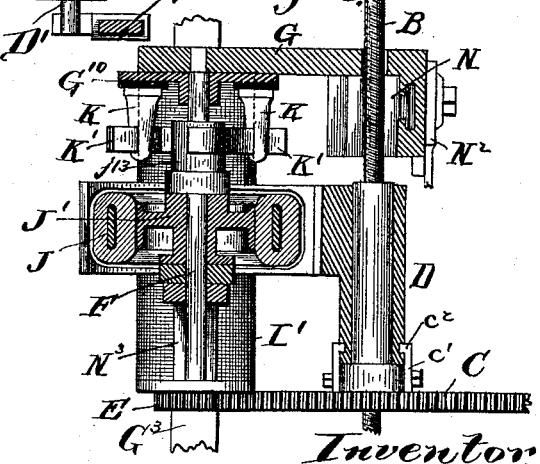

Figure 1 is a side elevation of a drill embodying my improvements. Fig. 1ª is a section of the edge portion of the upper field-magnet. Fig. 2 is a longitudinal section. Fig. 3 is a face view with the master-wheel detached. Fig. 3ª is a face view of the covering-plate. Fig. 4 is a face view of the face-plate. Fig. 5 is a rear inside view of the same. Fig. 6 is a section on line $x\,x$, Fig. 5. Fig. 7 is a section on line $y\,y$, Fig. 4. Fig. 8 is an enlarged view of part of Fig. 6. Fig. 9 is a section on line $z\,z$, Fig. 1. Fig. 10 shows the master-wheel detached. Fig. 11 is a side view of the top field-magnet. Fig. 12 is a side view of the bottom magnet. Fig. 13 is a front view of the armature. Fig. 14 is a rear view of the armature. Fig. 15 is a section on the line $x'\,x'$, Fig. 14. Fig. 16 is a longitudinal section of the connection-box on the drill, taken on line $y'\,y'$, Fig. 17. Fig. 17 is a plan view of Fig. 16. Fig. 18 is a front view of the trunnion-carrier detached. Fig. 19 is a section on line $z'\,z'$, Fig. 18. Fig. 20 is a face view of the driving-pinion. Fig. 21 is a longitudinal section of a modified form of the machine. Fig. 22 is a view from the rear of that in Fig. 21. Fig. 23 is a diagrammatic view showing one of the methods of distributing and supplying the current to machines. Fig. 24 is a diagrammatic view of one form of electric circuit and connections for the machine. Fig. 25 is a view, partly diagrammatic and partly complete, showing the manner of supplying the current from the mains to the connection-boxes and from the connection-boxes to two or more differing machines. Fig. 26 shows the parts in Fig. 17 together with parts of the electric circuit. Fig. 26ª is a section on the line $x^2\,x^2$ of Fig. 26. Fig. 26ᵇ is a section on the line $y^2\,y^2$ of Fig. 26. Fig. 27 shows in perspective one of the parts of the handle constituting a portion of the detachable section of the circuit, the end of the hose or cable containing the wires being also shown. Fig. 28 is a perspective partly broken away, showing the outer side of one part of the handle. Fig. 29 is a section through the handle. Fig. 30 is a perspective showing the interior of one of the parts of the handle. Fig. 31 is a face view of the wall-box adapted to contain and protect contact-pieces or exposed portions of the circuit at which electric connection can be made at will. Fig. 32 is a section through the same. Fig. 33 is a face view, Fig. 34 is a section, and Fig. 35 is a side view, of a modification of the motor. Figs. 36, 37, and 38 are similar views of another form of mechanism. Figs. 39, 40, and 41 are respectively a rear view, a vertical section, and a plan view, of another modified form of machine. Figs. 42 and 43 are side elevation and a vertical section of another form.

Referring at present to Figs. 1 to 20, A represents a bit or boring tool proper inserted into the socket $b$ on the end of the threaded stem B, the latter being provided with grooves at $b'$ to receive the gibs B', which connect the stem B to the master-wheel C. The latter has a tubular bearing part C', formed with grooves $c\,c$, into which are fitted the gibs B'. When the parts are thus connected, the stem will be rotated by the gibs and the wheel and can pass longitudinally through the wheel. The master-wheel is held by a clip $c'$, the flange $c^2$ of which engages with the flange $d$ on the trunnion-carrier. (Indicated as a whole by D.) The master-wheel C is driven by a pinion E on a shaft F. This shaft is in this construction supported on the core G of the field-magnet, it being situated on a line below the axis of said core, in order that as much as possible of the iron composing the latter shall be thrown well up. At the outer end this shaft is supported in the face-plate H. The upper core of the field-magnet comprises the said core G and the pole-piece G'. The lower core of the magnet comprises the core I and the pole-piece I'. The lower core of the field-magnet is used as the means for supporting the drill-stem, the master-wheel, and other parts to be described, it having a longitudinal aperture at $i'$. The pole-pieces are both thrown somewhat up, and are concave, as shown, their inner curved surface being struck from the axis of the shaft F. To this shaft F is secured the armature. (Indicated as a whole by J.) It is constructed, as shown, of a series (herein eight) of core-sections, (see Figs. 13 and 14,) each comprising a curved shank $j$, secured to or formed with end pieces $j'$. These end pieces have bolt-apertures through which pass the fastening-screws $j^2$. These sections are separately wrapped with their wire and then placed together so as to form a complete ring. The screws $j^2$ engage with a ring J', having a flange $j^4$ to receive them, a web $j^3$, and a hub $j^6$, which is keyed to the shaft F at $j^7$. (See Figs. 13, 14, and 15.) The terminals $j^8$ are inserted into metallic rods $j^9$, and secured by screws $j^{10}$ in the well-known series to form a Gramme ring. These rods $j^9$ are passed through rubber or insulating tubes $j^{11}$, and are secured to the commutator-flanges $j^{12}$ on the front side, (the contact parts $j^{13}$ being fastened to a wooden or other insulating flange-sleeve at $J^2$.) By preference the commutator-shaft is mounted in a brass or other non-magnetic bearing-block $F^2$, fastened in the core G. The armature and the commutator are entirely inclosed on the face side by means of the face-plate H and a supporting-ring H'. The latter is held by screws at $h'$, Figs. 2 and 7, to the upper and lower pole-pieces. The face-plate H is held in place against the ring H' by a ring $H^2$, secured by screws $h^2$, Figs. 3, 4, and 7, and partially overlies the plate H. The latter has a bearing $h^3$, through which the outer end of shaft F passes.

$H^4$ indicates an adjusting-lever secured to the face-plate H or its hub $h^3$, and by means of it the plate can be adjusted into any desired position, this plate supporting the brushes, as will be described. The plate after adjustment can be tightly locked in place by a screw and lever at $H^5$, its threaded end engaging with the ring $H^2$ and bearing against the plate H. (See Fig. 7.)

The brush-holders are indicated by K. They project inward from the face-plate H and are supported thereon against insulating material at $k$ by means of screws $k'$. The brushes themselves are shown at K', being clamped in the holders K K. To adjust the contact of the brushes upon the commutator without removing any of the fixed parts, I employ movable pressure-blocks $K^2 K^2$. (See Figs. 6 and 8.) They are pivoted at $k^3 k^3$ to the face-plate or parts secured thereto, and are formed of insulating material, such as rubber or hard wood. Adjusting-screws $K^3$ bear against them and are accessible on the outside of the machine. It will thus be seen that although all of the delicate and more or less dangerous parts of the machine are practically entirely inclosed, all of the adjustments mainly required with electric mechanisms can be readily attained, such as the shifting of the brushes around the axis and the changing of their pressure upon the commutator. These ends can be attained in ways other than those illustrated in the details herein shown without departing from the spirit of the invention.

Each of the brush-holders is in contact with the metallic strip $K^4$, resting against a curved contact-piece $K^5$, there being two of the latter supports upon the insulation at $k^6$. (See Figs. 5 and 6.) They are separated from each other, and when one is in contact with one of the pieces $K^4$ the other is in contact with the other. When the face-plate H with the brush-holders and the brushes is adjusted, the parts $K^4$ slip around but remain in contact with the metallic contacts $K^5$, thus preserving electric connection to the brushes. $K^6$ represents adjustable contacts, one bearing against one piece at $K^5$ and the other against the other. One of these contacts $K^6$ is connected by the wire terminal $k^7$ with the coil $G^2$ of the field-magnet. The other contact $K^7$ is connected with the wire $k^8$. (See Figs. 5, 26, and 26ᵃ.) This wire runs to a contact-piece $l$, inclosed within a protecting holder L', fastened to the side of the lower pole-piece. Below this wooden block L' there is a connection-box, preferably of metal, having two chambers, one at $L^2$ and the other at $L^3$. (See Figs. 16, 17, and 26.) The contact-piece $l$ bears against a contact $l'$, attached to a metal piece $l^2$, which is secured to spring-plate $L^4$, situated in the chamber $L^2$ and supported against insulating-block $L^5$. On the other side of the insulation $L^5$ there is a second spring-piece $L^7$, which has a metallic connection with a switch-lever $L^8$, situated in the chamber $L^3$ and pivoted at $l^3$, it having a handle $L^9$ projecting out from the chamber so as to be accessible. The lever $L^8$ can be moved to a contact $l^4$, which is in connection with a contact-plate $l^5$, projecting into the aforesaid wooden covering-block L'. It is adapted to be placed in contact with a plate $l^6$, with which is connected the terminal wire $x$. It will now be seen that if the spring-plates $L^4$ and $L^7$ are in electrical connection with a generator the current can be caused to enter at the plate $L^7$, and, if switch $L^8 L^9$ is in contact with $l^4$, passed through said lever and the contacts $l^4 l^5$ and wire $x$ to the coil $I^2$, and thence through the connection at $I^3$ to the upper coil $G^2$, thence through the terminal $k^7$ and contact $K^6$, thence through one contact-segment $K^5$ and an arm $K^4$ to one brush, thence through the commutator and armature to the other brush, thence through the other arm $K^4$ and contact-piece $K^5$ to the contact $K^7$, thence through the terminal $k^8$ to the plate $l'$, and to the spring-plate $L^4$ and back to the generator.

The devices for carrying the current around the machine, it will be seen, are all entirely inclosed and concealed, and by having them so arranged I can prevent their being harmed and also avoid danger to an attendant.

The devices for taking the current to and from the parts $L^4 L^7$ will be hereinbelow fully described. The upper and the lower cores of the field-magnet are joined by a neutral piece M, which not only completes the magnetic circuit, but is also utilized to support a number of the operative parts of the machine. The drill-stem is advanced by means of divisible nut-sections N N, mounted in a plate N', bolted to or formed on the connecting-piece M. This plate N' supports the lever N², which opens and closes the nut-sections in a way readily understood. The parts at $n$ of the nut-sections are brass, as is also the wheel-hub C'. These parts support the drill-stem, and, although the latter becomes powerfully magnetic, no friction results, as the magnetism therein does not affect these brass supports. At M' M², I have provided loop-handles for the machine, by which it can be readily picked up and manipulated, and by which, also, it can be held in the frame in any desired position after adjustment. The machine is so arranged that it can be adjusted upon a horizontal axis. At D' there are trunnions resting in vertically-adjustable trunnion-bars D²; adapted to be clamped to the frame-bars D³. The trunnions D' D' are cast with the aforesaid bracket-pieces D, which surround the sides and end of the lower pole-piece, having bolt-apertures at $d'$ for fastening it thereto, and having an aperture $d^2$ for the insertion of the wheel-hub C'. (See Figs. 18 and 19.) There is a short tube at $d^3$, terminating in the flange $d$, with which engages the clip $c'$ to hold the master-wheel in place.

In Figs. 21 and 22 a somewhat modified form of machine is shown, in which the shaft F is mounted in a bearing F' in the rear neutral piece M instead of the pole-piece G, which is bolted higher up on the neutral piece M. The brush-holders are mounted on a collar $K^9$ on the boss F² and the commutator-ring $j^{13}$ is placed in the rear of the armature, so that many of the small parts, contact-pieces, screws, &c., can be omitted, the principal features remaining the same.

For connecting machines with the mains extending from the generator, I employ a flexible hose or cable, it having an outer cover and protecting jacket, and having within it one or more electric conductors terminating in automatically-operating contacts adapted to be detachably connected with counterpart contacts secured to the machine or to the devices which support it. This part of the invention will be readily understood by a more particular reference to Figs. 25 to 32, in connection with the above-described Figs. 1, 3, 9, 16, 17, and 26. O indicates rubber hose, of which for each piece enough is taken to reach from the terminals of the mains on the neighboring wall, as will be described, to all points where the machines will be ordinarily situated. Through these are passed the wires or the conductors $o\ o'$, and for some purposes additional wires, as at $o^4$. These wires may be twisted together and braided with or otherwise covered by fibrous material, so as to form a cable. Rubber hose, however, is preferable for many reasons, among which is the fact that these conductors are constantly lying on the ground, which is liable to charge the ordinary cable material with dirt and foreign materials, which would be disastrous if they found access to the interior conductors. The hose effectually guards against abrasion of the conducting surfaces, and the attendants are perfectly safe from current in manipulating them. The hose terminates in handle-pieces. That to be attached to the machine is indicated by O', and that to be attached to the wall terminals is represented, as a whole, by O⁷. These may be more or less similar in character and structure, and hence both need not be described in all details.

Figs. 27 to 32 show more particularly the parts which are to effect an attachment to the wall-terminals. O² O² are two insulating-pieces, preferably of hard wood. In them is formed an aperture, as at O⁸, adapted to receive the end of the hose or cable. They can be firmly clamped together, so as to constitute a handle-piece. In the outer end there is a chamber, in which are placed two contact-pieces O⁴ O⁵. The wire $o$ is fastened to one and the wire $o'$ to the other. As shown in some of the figures, there is a third wire inclosed in the above-described devices, this wire being adapted to be so connected as to constitute part of a shunt-circuit for resistance, for lighting, or other purposes. It is indicated by $o^4$ and is connected to a third contact O⁶, which, for reasons that will be readily understood, can be on the outside of the handle; but it also may be inclosed, if desired. At the other end of the hose or cable there is a handle-piece having parts corresponding to those above described. Its outer end is adapted to be thrust into and held tightly in the above-described contact-box L². When it is in place, the contacts it contains come, respectively and automatically, into connection with the contacts L⁴ L⁷ in said box.

Figs. 25, 31, and 32 show the manner of attaching the portable conductors to the machines and to the wall-terminals, and Figs. 23 and 24 illustrate, diagrammatically, the complete circuits from the generator to the machines, lights, &c. Q Q' Q² indicate three wires from the generators, they being arranged relatively to the latter and to each other in the well-known way. They are carried through and supported in the entries, rooms, &c., in the mine in any suitable manner. At R they are connected to lights which are independent of the machines. They are also connected to the wall-terminals for supplying the machines. To provide the latter I employ one or more, preferably several, boxes situated permanently at places near which power is to be applied. They may be made of any suitable material. I employ metal boxes provided, where necessary, with insulating material. They are indicated by P, Fig. 32, insulation being shown at P'. Several boxes are cast together and have base plates for securing them to the wall of some stationary support. Each box contains one or more contacts, as at $p\ p'$, each in electric connection with binding-posts, as at $p^2 p^3$. When a shunt-circuit is employed to connect with a wire, such as at $o^4$, in the hose or cable, there should be a third contact in the wall-box. Those at $p$ and $p'$ are for the incoming and outgoing main current. The wires Q Q' Q² have branches $q$ $q'$ $q^2$, which are connected to the posts at $p^2$ $p^3$ in the proper manner. Preferably also switches, as at $q^3$, are interposed in each branch, although not necessary. At Q³ are fusible safety-plugs, each of which limits the total current passing through its branch, and then preferably there are at Q⁴ plugs of less capacity to govern the current to each machine. From the three wires currents of different tension can be taken, and if said wires be properly connected they can be so arranged as to deliver through the different boxes different currents for varying machines. Thus in Fig. 25 two machines are indicated, of which one and its current-supplying devices are so arranged as to take a higher current, and the other and its connections are disposed so as to take a lower, the machine at the left of the figure being of the nature of a drill such as shown in the figures above described, and the one below being a larger machine for undercutting. Referring to Figs. 23 and 24, the different paths which the current can be caused to take will be understood. At R' are shown lights placed in a shunt-circuit including the armature terminals and the above-mentioned wire $o^4$ in the hose. Should the current passing through the machine exceed the desired limit it will be shunted to these lights at R, and can therefore be utilized for lighting the mine or other locality where the machines are used. Instead of lights at R' a resistance can be employed to regulate the operation of the machine. In either case it will be seen that no parts have to be manipulated by the attendants beyond inserting the handles of the hose or cable into their respective boxes.

In Fig. 24 there is a diagrammatic illustration of the use of the shunt-circuit around the field of the machine.

In Figs. 31 and 32 the wall-terminal box is shown as arranged with the cells horizontally disposed. The top wall is extended to provide a water-shed, and, to prevent the entrance of water or moisture or foreign materials when the boxes are out of use, a door P⁴ is employed which tightly incloses the contacts within it.

In the construction in Figs. 1 to 2 the cores of the field-magnet are arranged, as will be seen, one above the other, and both substantially horizontal, they varying somewhat from the latter position under differing adjustments; but they are, by reason of this arrangement, always both on lines between the side bars B³ of the supporting-frame. Hence the machine, as a whole, can be made narrow and the parts arranged compactly. It will be further seen that by arranging the armature and its shaft so that their axis is out of line with the axis of the field-magnet which supports them, the core of the latter can be thrown relatively up or away from said axis, so that the metal thereof shall be more nearly in line with the pole-piece. This arrangement is superior to that I have heretofore followed of having the axis of the armature-shaft coincide with that of the core which supports it. Moreover, by having the axis of the armature-shaft above the midway line between the axes of the cores the lower pole-piece can be thrown up in such way that the lower core can be utilized to advantage in the way described for supporting one or more of the driven or operative parts. The magnet is so disposed that it acts to close and protect the pole-chamber on one side of the armature, the above-described closing devices H H' H² serving a similar purpose on the opposite side. The construction in Figs. 1 and 2 is similar to that in Figs. 21 and 22, in that the brushes lie between the first plane of the armature and the neutral connecting-piece M of the field, which latter serves also to assist in inclosing the smaller parts and in supporting the driven or operative parts. I herein speak of the contacts on the machine, those on the wall, and those in the portable conductor as being automatic, meaning thereby that when one of them is caused to approach its counterpart there is an engagement of them together caused without requiring special manipulation.

In Figs. 33, 34, and 35 a mechanism is shown which also embodies many of the features above described. In this case the drill is not supported directly upon trunnions, though it is vertically adjustable bodily on the supporting-frame G³. The field-magnets are here arranged vertically and are provided with guideways to receive the frame-bars. In machines of this sort it is desirable to have all of the parts arranged as compactly as possible, and the frame G³ G³ should be as narrow as practicable in order to give it the proper strength. By passing the frame-bars through the motor they can be kept comparatively close together and the motor can be allowed to extend laterally as far as is necessary to provide parts of sufficient size to provide the requisite power. The drill-stem B in this case is situated transversely to the field-magnets, but passes between them, it being mounted in a bearing at B³ on one of the neutral bars or plates M. The armature is here mounted in a way substantially similar to that provided in the construction in Figs. 1 and 2, except that its shaft is at the inner end supported in a plate or bearing F², secured to the pole-pieces. The brushes can be constructed, supported, and adjusted as in the construction above described, or in any other preferred way.

The machine shown in Figs. 36, 37, and 38 is mounted upon trunnions, so that it can be vibrated in its supporting-frame, the trunnions being somewhat different from those in the mechanism in Figs. 1, 2, and 3, in that they lie on a line passing through the frame-bars, this being possible here because of such a disposition of the parts of the motor that it is balanced on the aforesaid line that intersects the frame-bars. The master-wheel C in this case has external instead of internal teeth, and the drill-shaft is supported in a bearing at the end of one of the field-magnets and on a line in the plane of, but transverse to, the longitudinal axis of the magnet. The trunnions are formed upon or secured to metal plates, preferably brass, which are fastened to the pole-pieces of the field-magnets and which also act to connect said magnets and mutually support and brace them.

In Figs. 39, 40, and 41 a mechanism is shown having many features of construction and arrangement similar to those above described; but it differs from the other forms, namely, in this that the armature-shaft and drill-shaft are on the same axis, the former being hollow and the latter passing through it. The armature-pinion E transmits power through intermediate wheel or wheels $E^3$ to the master-wheel C. The latter engages with the grooved drill-stem and has its hub $C'$ mounted in a bearing $C^5$, carried by frame-arms $C^6$, which arms are fastened to the field-magnets. The nut or feed device can be mounted upon the rear face H, or it also may be held by the frame $C^6$.

In Figs. 42 and 43 I have shown the parts arranged for operating vertically. The field-magnets are mounted vertically on the supporting-frame $G^3$, and the brush-holders K are secured to the part $G^{10}$, the brushes $K'$ bearing against the commutator $j^{13}$, mounted upon the armature-shaft F. The latter is also mounted vertically in bearings in the parts $G^{16}$, I, and has at one end a pinion E, engaging with and driving the master-wheel C, which is mounted in bearing $D'$ and nut N at one side. The armature is held in place by supports $N^3$, bolted to the part I.

I do not in this case claim the combination of a rotating and longitudinally-feeding drill-rod, a support therefor, an electric motor having a rotating armature-shaft on said support, gearing between said armature-shaft and drill-rod, feeding mechanism for the drill-rod, and devices for disengaging the feeding mechanism from the drill-rod to admit of a quick return of the drill-rod independent of the feeding mechanism, as that matter constitutes the subject of a claim in another application, filed by me December 24, 1896, Serial No. 222,524.

What I claim is—

1. An electric drill or analogous machine, having in combination, a field magnet, a rotary armature, an armature shaft having its bearings on one part of the field magnet, a longitudinally movable driven shaft having its bearings on another part of the field magnet, and a driven wheel concentric with the last said shaft and mounted independently thereof in fixed relations with the field magnet, substantially as set forth.

2. An electric drill or analogous machine, having in combination, a field magnet, a rotary armature, an armature shaft mounted on one part of the field magnet, and having a driven shaft mounted on another part of the field magnet parallel with the armature shaft and situated to lie across the planes of the armature, whereby said driven shaft can be elongated without unduly elongating its supporting connection by which it is held to the motor, substantially as set forth.

3. In an electric drill or analogous machine, the combination of a field magnet, a rotary armature, an armature shaft, a driven shaft having a bearing in front of the armature and a bearing in rear of the armature, all the aforesaid parts being connected together as a unitary structure which is vibratable or axially adjustable, a supporting frame for said structure adapted to be made stationary, and an axial support interposed between the said frame and structure, substantially as set forth.

4. In an electric drill or analogous machine, the combination of the field magnet, the armature, and the armature shaft mounted at one end in one of the cores of the field magnet, and the other end mounted in a bearing secured to the pole piece of the field magnet, substantially as set forth.

5. In an electric drill or analogous machine, a field magnet having two parallel cores, an armature shaft mounted in one of said cores and out of line with the axis thereof and a driven shaft mounted in the other field core, and extending through it, substantially as set forth.

6. In an electric drill or analogous machine, a field magnet having parallel cores and helices, the armature having its shaft parallel to the axes of the cores, and situated out of the midway line between their axes, the power devices, and the driven mechanism geared to the armature shaft and supported on the field magnet, substantially as set forth.

7. In an electric drill or analogous machine, the combination with the field magnet, of the trunnions supporting the field magnet, the power mechanism, and the driven mechanism, connected to said field magnet, substantially as set forth.

8. In an electric drill or analogous machine, the combination of the field magnet, the armature, the trunnion or hinge like support which carries the field magnet, and the stationary frame which supports said trunnion, substantially as set forth.

9. In an electric drill or analogous machine, the combination of the rotary armature, a field magnet having two poles adapted to lie either in a vertical line one above the other, or in lines inclined to the vertical, and the axial support for the said magnet bodily movable vertically, substantially as set forth.

10. In an electric drill or analogous machine, the combination with the portable frame adapted to be made stationary, of the field magnet adjustable vertically on said frame, the armature, the armature shaft, and the pole pieces of the field magnet having the armature shaft at their axis and arranged to vibrate to have said axis horizontal or inclined to the horizontal, substantially as set forth.

11. In an electric drill, or analogous machine, the combination with the stationary frame, of the field magnet supported in said frame, the armature, the driven shaft supported on said magnet, and the means secured to said magnet for advancing the operative parts, substantially as set forth.

12. In an electric drill or analogous machine, the combination of the armature, the armature shaft, supported as set forth to be adjusted in vertical planes around a horizontal axis, the field magnet, the main supporting frame for said magnet, and the driven shaft mounted in fixed relations to the armature shaft and adjustable axially therewith, substantially as set forth.

13. In an electric drill or analogous machine, the combination of the frame, the field magnet, the operative parts, the power transmitting devices on one side of said magnet, and the advancing mechanism on the other side, substantially as set forth.

14. In an electric drill or analogous machine the combination of the frame, the field magnet, the armature supported thereon, one of the cores of said magnet having an aperture, the driven part passing through said aperture, and the power transmitting devices, substantially as set forth.

15. In an electric drill a field magnet, having attached thereto the driven shaft, the devices which support the magnet, and mechanism actuated by the motor for advancing the operative parts of the drill, substantially as set forth.

16. In an electric drill or analogous machine, a field magnet having the driven shaft passed through it, the wheel which actuates said shaft mounted on said magnet and means for holding said wheel in place relatively to said magnet independently of the driven shaft, substantially as set forth.

17. In an electric drill or analogous machine, the combination of the field magnet pole pieces the armature between them, the closing devices for the chamber between the pole pieces, the armature shaft passing through said closing devices, the commutator and the adjustable brushes inside of said chamber, and means outside thereof connected to the brushes for adjusting them, substantially as set forth.

18. In an electric drill or analogous machine, the combination, with the pole pieces and the armature mounted between them of the commutator inside of the outer plane of the armature, the adjustable brushes also inside of said plane and devices for closing the chamber formed in the armature, substantially as set forth.

19. In an electric drill or analogous machine, the combination with the field magnet pole pieces, and the armature mounted in the chamber between them of the closing devices for said chamber, the armature shaft having one end supported directly in a core of the field magnet, and having the power wheel outside of said closing devices, substantially as set forth.

20. In an electric drill or analogous machine, the combination with the field magnet having pole pieces, the rotary armature between them, and the commutator, of the protecting wall formed with or secured to the field magnet and extending to or beyond the outer lines of the commutator, and the armature shaft having a bearing directly in the metal forming the field magnet, whereby the parts are reduced, and the commutator and brushes are protected when the motor is being carried, substantially as set forth.

21. In an electric drill or analogous machine, the combination with the field magnet having pole pieces, the rotary armature between them, and the armature shaft having a bearing directly on the metal forming part of the magnetic circuit of the field magnet of the plate or shield in front of the pole pieces and armature, and having the armature shaft passed therethrough, substantially as set forth.

22. In an electric drill or analogous machine, the combination with the field magnet pole pieces, the armature mounted between them, the parts driven by the armature and supported on the field magnet, and the neutral pieces of the field magnet, arranged to assist in supporting the operative parts of the machine, substantially as set forth.

23. In an electric drill or analogous machine, the combination with the field magnet pole pieces, and the armature, of the closing devices in front of the armature, the adjustable brushes in the pole chamber, the stationary electric conductor inside of said chamber and connected with the brushes, substantially as set forth.

24. In an electric drill or analogous machine, the combination with the pole pieces and the armature, of the brushes and the commutator in the pole chamber, the stationary electric conductors in said chamber connected with the brushes means for adjusting the brushes, and the removable closing devices in front of the armature, substantially as set forth.

25. In an electric drill or analogous machine, the combination with the field magnet pole pieces, and the armature, of the closing devices in front of the armature, the brushes inside thereof, and means accessible from the outside of said closing devices for adjusting the pressure of the brushes, substantially as set forth.

26. In an electric drill or analogous machine, the combination with the field magnet pole pieces, the armature having its shaft parallel to the axis of the field helices, and the neutral or connecting piece of the field magnet, of the brushes mounted between the front plane of the armature, and said neutral piece, and means for adjusting the brushes, substantially as set forth.

27. In an electric drill or analogous machine, the combination with the field magnet, the commutator, and the armature, of the closing devices in front of the armature, the brushes inside thereof and the separable electrical contacts inside thereof, substantially as set forth.

28. In an electric drill or analogous machine, the combination with the field magnet, and the armature, of the front bearing for the armature, the wheel outside of said bearing, the driven shaft mounted on one core of the magnet, and the gearing interposed between said wheels and the driven shaft, substantially as set forth.

29. In an electric drill or analogous machine, the combination with the field magnet, the commutator, and the armature, of the closing devices in front of the armature, the adjustable brushes, and the wheel on the armature shaft outside of the said closing devices, substantially as set forth.

30. In a portable electric drill or analogous machine, the combination of the portable supporting frame, the field magnet secured thereto, the armature, the armature shaft, the field magnet and armature being provided with wire helices having two insulated terminals external to the aforesaid parts and a detachable conductor section having at its end two insulated terminals adapted to be detachably connected to the aforesaid external terminals, substantially as set forth.

31. In a portable electric drill or analogous machine, the combination with the movable and adjustable field magnet, and the driven parts, of the contacts secured thereto, and a detachable portable conductor section having at its end two mutually insulated terminals each surrounded by an insulating or protecting casing, and said portable conductor being adapted to be detachably connected to supply mains, substantially as set forth.

32. In a portable electric drill or analogous machine, the combination with the driven parts, of the movable and adjustable field magnet, the portable frame, the contacts supported thereon, the inclosing devices for said contacts, and the portable contacts adapted to be engaged therewith, substantially as set forth.

33. In a portable electric drill or analogous machine, the combination with the driven parts and the portable field magnet of the contacts supported thereon and a portable conductor section having at its end mutually insulated contacts surrounded by a protecting casing and corresponding with the aforesaid contacts, and the switch supported on the magnets, substantially as set forth.

34. In a portable electric tool of substantially the character described, the combination of the following elements, namely an electric motor having a rotating armature and a field magnet, a portable frame, the adjustable connecting devices for attaching the motor to the frame in different positions vertically, a trunnion or hinge like support interposed between said vertically adjustable connecting devices and the motor and adapted to permit the motor to be adjusted axially, the rotary driven shaft geared to the armature and connected to the field magnet by bearings holding it in a fixed line in relation thereto, and a detachable electric conductor section or cable having insulated contacts or circuit sections and adapted to be attached to said motor and convey current thereto irrespective of the vertical or axial positions to which it is adjusted on said frame or trunnion, substantially as set forth.

In testimony whereof I affix my signature in presence of two witnesses.

HENRY H. BLISS.

Witnesses:
GEO. A. HOWARD,
BURTIS W. SOMMERS.

It is hereby certified that in Letters Patent No. 545,570, granted September 3, 1895, upon the application of Henry H. Bliss, of Washington, District of Columbia, for an improvement in "Electric Coal or Rock Drills," an error appears in the printed specification requiring correction as follows: In line 57, page 5, the date, "December 24, 1896," should read *December 24, 1886;* and that the said Letters Patent should be read with this correction therein that the same may conform to the record of the case in the Patent Office.

Signed, countersigned, and sealed this 10th day of September, A. D. 1895.

[SEAL.]

JNO. M. REYNOLDS,
*Assistant Secretary of the Interior.*

Countersigned:
   S. T. FISHER,
     *Acting Commissioner of Patents.*